United States Patent [19]

Hilderbrandt

[11] 3,836,415

[45] Sept. 17, 1974

[54] METHOD OF FABRICATING A PRECONTOURED UNITIZED ELECTRICAL WIRING HARNESS

[75] Inventor: Lynn H. Hilderbrandt, Dearborn Heights, Mich.

[73] Assignee: Ford Motor Company, Dearborn, Mich.

[22] Filed: Nov. 3, 1972

[21] Appl. No.: 303,664

[52] U.S. Cl. ............ 156/296, 29/203 MW, 156/50, 156/306, 156/583, 174/72 A, 174/117 F, 219/243, 264/248, 307/10 R, 307/147, 339/97 R, 339/148
[51] Int. Cl. ........................ H01b 13/00, H02g 3/02
[58] Field of Search .... 174/70 R, 71 R, 72 R, 72 A, 174/117 R, 117 F, 117 FF; 29/203 MW, 592, 624, 407; 156/47, 50, 306, 296; 200/166 PC, 168 E; 264/248; 307/10 R, 147; 317/101 F, 122; 339/17 F, 97 R, 97 P, 148, 208

[56] References Cited
UNITED STATES PATENTS

| 1,290,153 | 1/1919 | Fitzpatrick | 174/71 R UX |
| 2,723,327 | 11/1955 | Gilbert | 200/168 E |
| 2,912,548 | 11/1959 | Wodal | 200/168 E |
| 3,021,947 | 2/1962 | Sylvester et al. | 156/306 UX |
| 3,440,118 | 4/1969 | Obeda | 264/248 X |

FOREIGN PATENTS OR APPLICATIONS

| 1,544,150 | 9/1968 | France | 174/72 A |
| 1,559,509 | 1/1969 | France | 174/72 A |

Primary Examiner—Laramie E. Askin
Attorney, Agent, or Firm—Keith L. Zerschling; Joseph W. Malleck

[57] ABSTRACT

A wiring harness comprised of a plurality of conductive wires each encased in a tubular nonconductive thermoplastic sheath and placed in side-by-side alignment, the plurality of conductive wires being precontoured and restrained in such condition by a plurality of transverse hinges formed from said thermoplastic sheathing and interconnecting adjacent wires of said harness. The unitized harness is employed in a wiring system particularly useful in an automotive vehicle; the system has connective blocks for joining the extremeties of said wires with an energy source or for switching purposes, each of said blocks being characterized by contacts effective to penetrate the wire sheathing and make contact with the conductive element, each of said contacts having a portion for receiving remote conductors by simple insertion.

1 Claim, 5 Drawing Figures

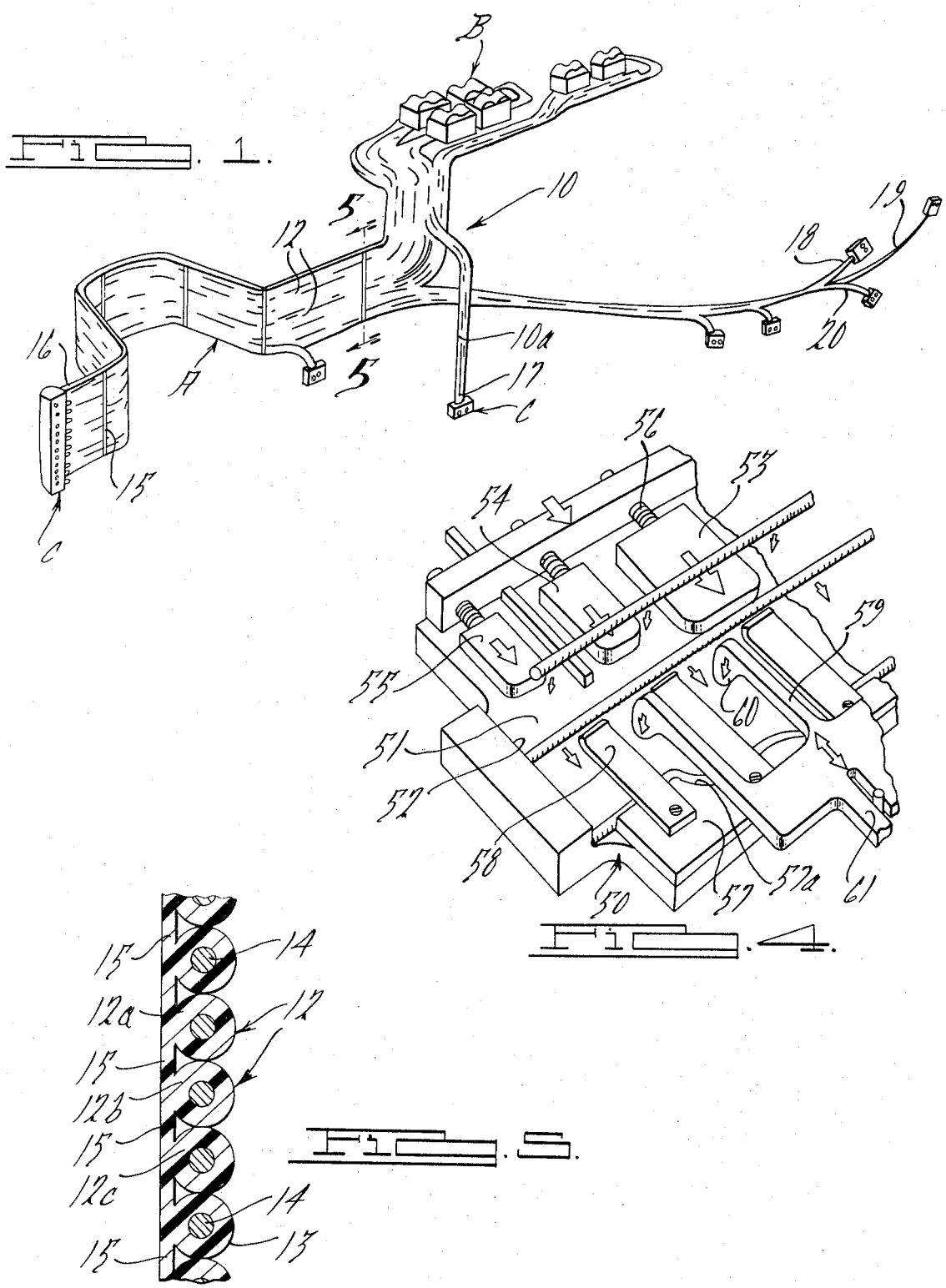

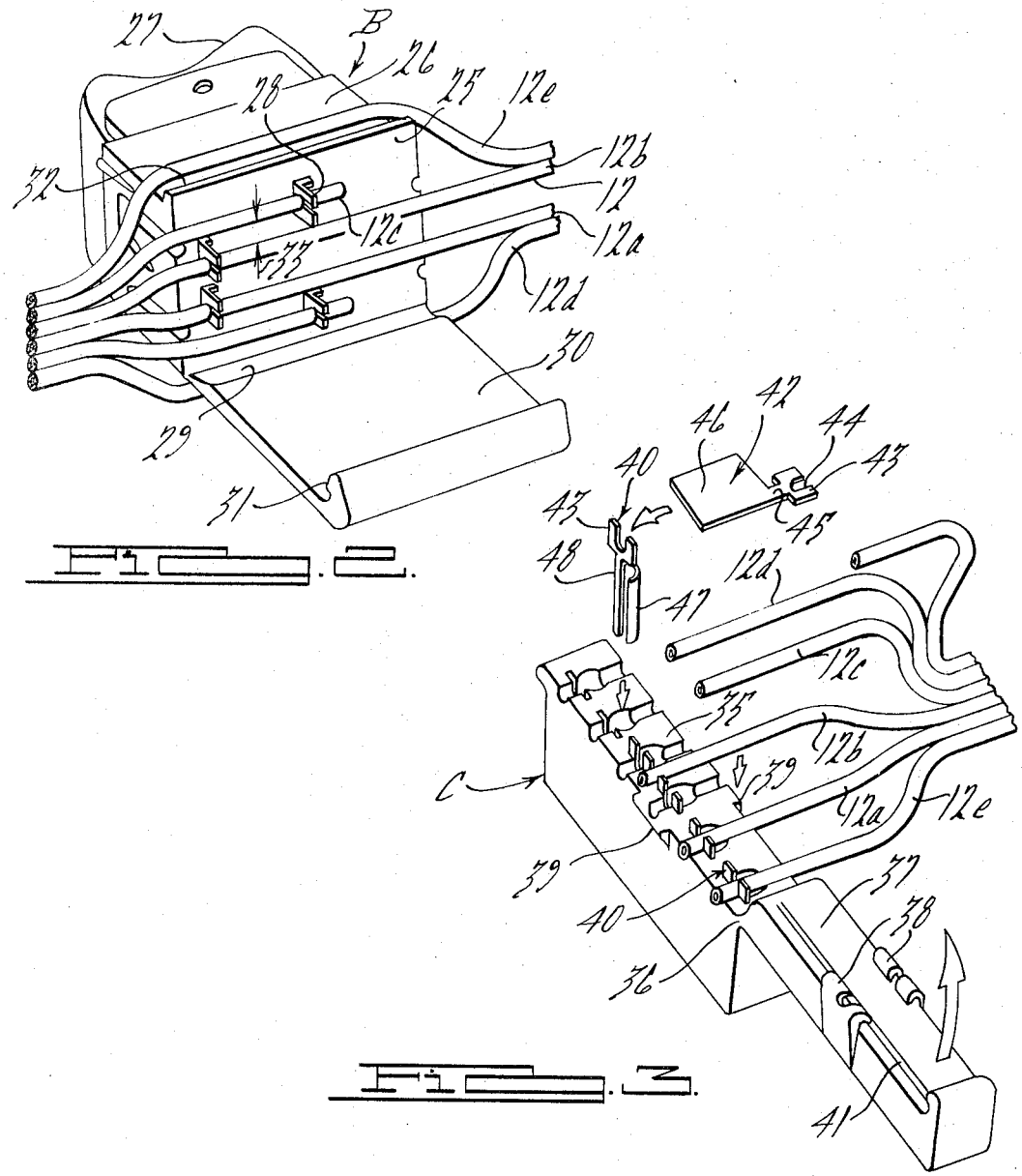

3,836,415

METHOD OF FABRICATING A PRECONTOURED UNITIZED ELECTRICAL WIRING HARNESS

BACKGROUND OF THE INVENTION

The desire for a multiple conductor package has resulted in the popular use of parallel aligned small-diameter wires embedded in a flat plastic tape or insulating strip to form a unitized cable. Such package has found utility in electronic and telephone communication apparatus where the wires are very fine and numerous. However, the expense of fabricating such cables for automotive use has been prohibitive because assembly techniques are considerably different than those employed in the telephone industry. Prior art cables have necessitated wide spacing between individual conductors within an insulated strip so as to allow for piercing of contacting elements through the nonconductive portion without cutting across an adjacent conductor causing an imperfect circuit. The unitized cables therefore require more space between individual conductors and are not as conveniently compact as desired.

In present wiring systems in automobiles today, it is typical to utilize the economy of conventionally formed independent wires having a tubular thermoplastic sheathing about the metallic conductor therein. These wires are typically bundled together in groups such as by taping. The cluster configuration of such taped wires promotes inadequate heat dissipation, particularly for the intermost wires in the cluster.

Both the unitized cables and clustered conductors have been produced as a basic commodity with little or no attention to precontouring for the specific requirements of the automotive industry. The need for easy and quick installation on the production line is met better by predimensioned conductive paths not attainable by the unitized cable and cluster approach.

SUMMARY OF THE INVENTION

The present invention provides a simple method and apparatus for making use of conventionally formed conductive wires in an automotive application which meets the requirements of precontouring and unitized harness systems all at a low cost.

A particular feature of the method is the placing of a plurality of tubular sheathed conductor elements in contiguous side-by-side alignment, then urging said aligned conductors into a predetermined three-dimensional configuration, and then passing a heating element transversely across a sufficient number of locations of the harness to effectively soften and extrude an integral connection between adjacent wires at said locations and thereby provide a severable but stable connection for maintaining said precontouring.

BRIEF DESCRIPTION OF THE DRAWINGS

FIG. 1 is an isometric illustration of a wiring system including switch and connector blocks, all precontoured for a specific automotive installation;

FIG. 2 is an enlarged view of one of the switching blocks illustrating the device in the open condition and the conductors in an inserted condition;

FIG. 3 is an enlarged isometric view of a connector block shown in one open position to illustrate conductors and contact elements therein; certain sequential fabricating steps are also included;

FIG. 4 is an isometric view of a contouring device effctive to accept a plurality of conductors and join them in a predetermined configuration; and FIG. 5 is an enlarged cross sectional view taken along line 5—5 of FIG. 1.

DETAILED DESCRIPTION

Turning now to FIG. 1, there is illustrated one application of this invention useful in an electrical wiring system to be used within the interior of an automotive door panel. The harness provides electrical conductors between various circuit elements used in controlling the operation of power windows, door lights and various other functions. The harness 10 has a predetermined three-dimensional configuration to fit the unusual space requirements of an automotive door application and is comprised of a plurality of conventionally manufactured conductors or electrical wiring elements 12 arranged in contiguous side-by-side aligned relationship (conventionally manufactured means copper wires encased in a tubular thermoplastic sheathing which are known for economy of mass production). At one extremity, for example 16, a primary terminal connecting device is provided and at other extremities of the various conductors, for example at 18, 19, 20 and 17, secondary terminal connectors are positioned. In addition, a plurality of switching means B is employed to interrupt the electrical circuits constituted by the individual conductors.

In the main of the predetermined configuration, the conductors are aligned in a flat silhouette (as best seen in cross-section in FIG. 5); certain legs of conductors are manually severed to meet specialized routing such as at 10a. Each of the conductors 12 is in contiguous contact, that is to say, the copper core 14 encased in a tubular thermoplastic sheathing 13 is placed in tangential contact with the next conductor such as between 12b and 12c. A portion of the thermoplastic casing is softened by heat and extruded to form a hinge 15 between adjacent conductors; when returned to room temperature, the solid condition of the hinge provides a severable but sufficiently rigid connector for maintaining the conductors in the predetermined configuration. Each hinge has a thickness at least 30 percent of the thickness of a radial section of the tubular encasement.

A typical connector block for quick assembly line installation, comprises the block C (as best shown in FIG. 3). Here the hinges holding together individual conductors are manually severed and the conductors are spaced apart. This is for the purpose of facilitating the mounting of individual conductors onto contact elements 40 which project from a mounting surface 35 of the block. The contact elements are formed from sheet metal with stamped yoke 43 having a crotch dimensioned equal to the diameter of the copper core 14; pressing of the conductor onto the contact results in penetration of the yoke edge 44 into the thermoplastic sheathing and into intimate non-severing contact with the core 14.

The contact elements 40 have a unique configuration in that they are initially stamped from a flat piece of sheet metal stock 42 provided with a rather large flange 46; the flange is formed into a semicylindrical portion 47 with a part 48 of the flange 46 providing a column to prevent movement when inserted into the block. The semicylindrical portion 47 is adapted for quick-insertion contact with other electrical elements (not shown) forming part of the wiring system.

The nonconductive supporting block in FIG. 3 provides the mounting surface 35 and a cover 37 is hinged at 36. The block and cover, when pivoted about the hinge, form a total enclosure for the contact elements. This is facilitated by a groove 41 defined on the interior side of the cover 37 and adapted to snuggly receive the projecting yokes of the contact elements. Lips 38 are integrally formed thereon to snap over and about protuberances 39 on the other portion of the block to maintain a resilient lock.

The switching means B (as shown in FIG. 2) may comprise a mounting surface 25 carried by a nonconductive case 26. Within the case is disposed conventional switch elements (which may be of the rocker type having a central V-shaped switch member pivoted by member 27 about the apex of the V from one position to another. In one of the positions of the switch, contact is made with bladed elements electrically in connection with the contact elements 28 projecting from the surface 25. The contact elements may be constructed similar to the elements 42 of the terminal means C. The switch blocks are constructed with a hinged cover 30 having hinge 29 arranged so that upon installation of each of the conductors (12a, 12b and 12c, etc.) spaced apart a dimension 33, and having pressed them into place on the contacts, the cover is folded over and locked into position by lip 31 sprung about flange 32.

A preferred method for constructing the apparatus of FIG. 1 would essentially comprise the steps of (1) arranging a plurality of conductors or elements, each encased in a tubular thermoplastic sheathing, the elements being placed in contiguous side-by-side parallel aligned relation, (2) urging said aligned conductors into a predetermined three-dimensional configuration while maintaining the cross-sectional alignment, and (3) passing a heated element transversely across spaced locations of the harness in a manner to soften and extrude several integral connecting hinges across the plurality of conductors, the hinges being of sufficient dimension to maintain the preshaped configuration of the harness and at the same time allowing for manual severability.

A fixture that would be useful in preshaping the conductive elements is shown in FIG. 4. This device 50 may comprise a working surface 51 on which is placed the desired number of conductors in contiguous relationship and precut to extend to the proper useful length. The precut conductors are placed so as to abut a stop surface 52 forming an integral part of the device 50. On one side of the fixture is a contour block 57 having a contour surface 57a which provides a desired shape against which the conductors may be urged to assume the predetermined configuration. Similarly (although not shown in FIG. 4) the working surface 51 may also be contoured to provide a change in shape in a different plane. A number of contour shaping rams 53, 54 and 55 may be adjustably supported by screw members 56 on a common element for coordinated movement in a plane across the working surface 51 and thereby urge the collected conductors in coordinated side-by-side alignment against the shaping block. Fingers 58 are employed to maintain the alignment in a single cross sectional plane. Finally, a heated assembly 59, having a plurality of scoring arms each carrying a nose 60, is movably mounted for passing the noses 60 across the sheathing of the conductors to soften and score the thermoplastic tubing and thereby extrude a hinged portion interconnecting each of the conductors of the harness. The arms may be disposed at desired longitudinal locations along the harness so as to insure rigidity of the preformed configuration and yet allow for easy manual severability.

Although the device 50 has been described as operable by moving rams simultaneously against the plurality of wires, the device may be constructed to sequentially shape each of the conductors separately and then bring them together for hinging, either individually or simultaneously.

I claim as my invention:

1. A method of fabricating a precontoured unitized electrical wiring harness, comprising the steps of:
    a. arranging a plurality of conductors in contiguous side-by-side parallel aligned relationship, each encased in a tubular thermoplastic sheathing,
    b. urging said aligned conductors into a predetermined three-dimensional contoured configuration while maintaining the contiguous alignment of said conductors, and
    c. passing a heated element transversely across the aligned conductors at spaced locations along the length of said conductors to disrupt said sheathing, said passing being carried out in a manner to effectively soften and extrude an integral hinge between adjacent conductors which is substantially tangent to both adjacent conductors at independent locations on said adjacent conductors, said hinges being capable of maintaining the contoured configuration of said harness while providing for easy severability of conductors at selected locations.

* * * * *